UNITED STATES PATENT OFFICE.

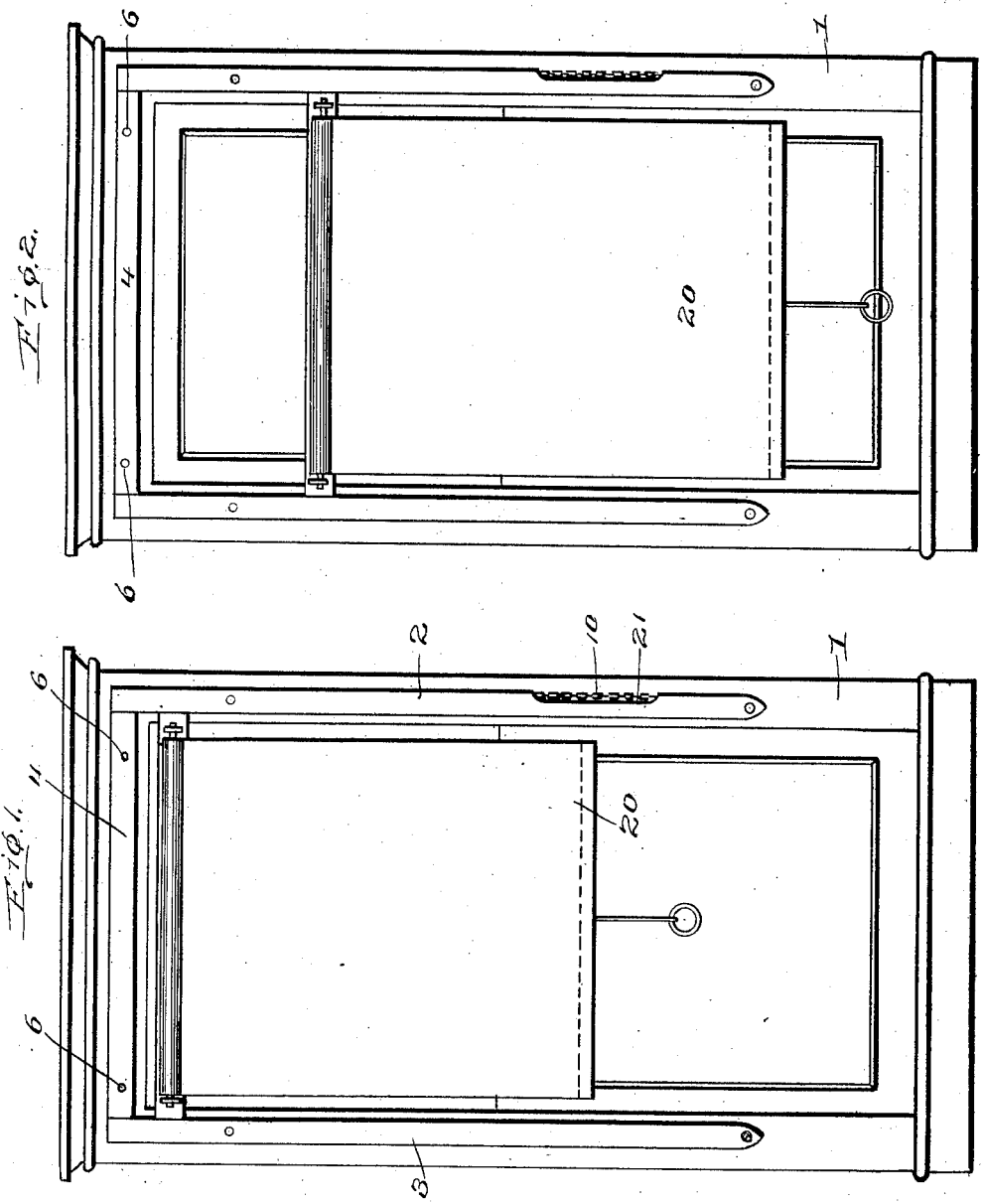

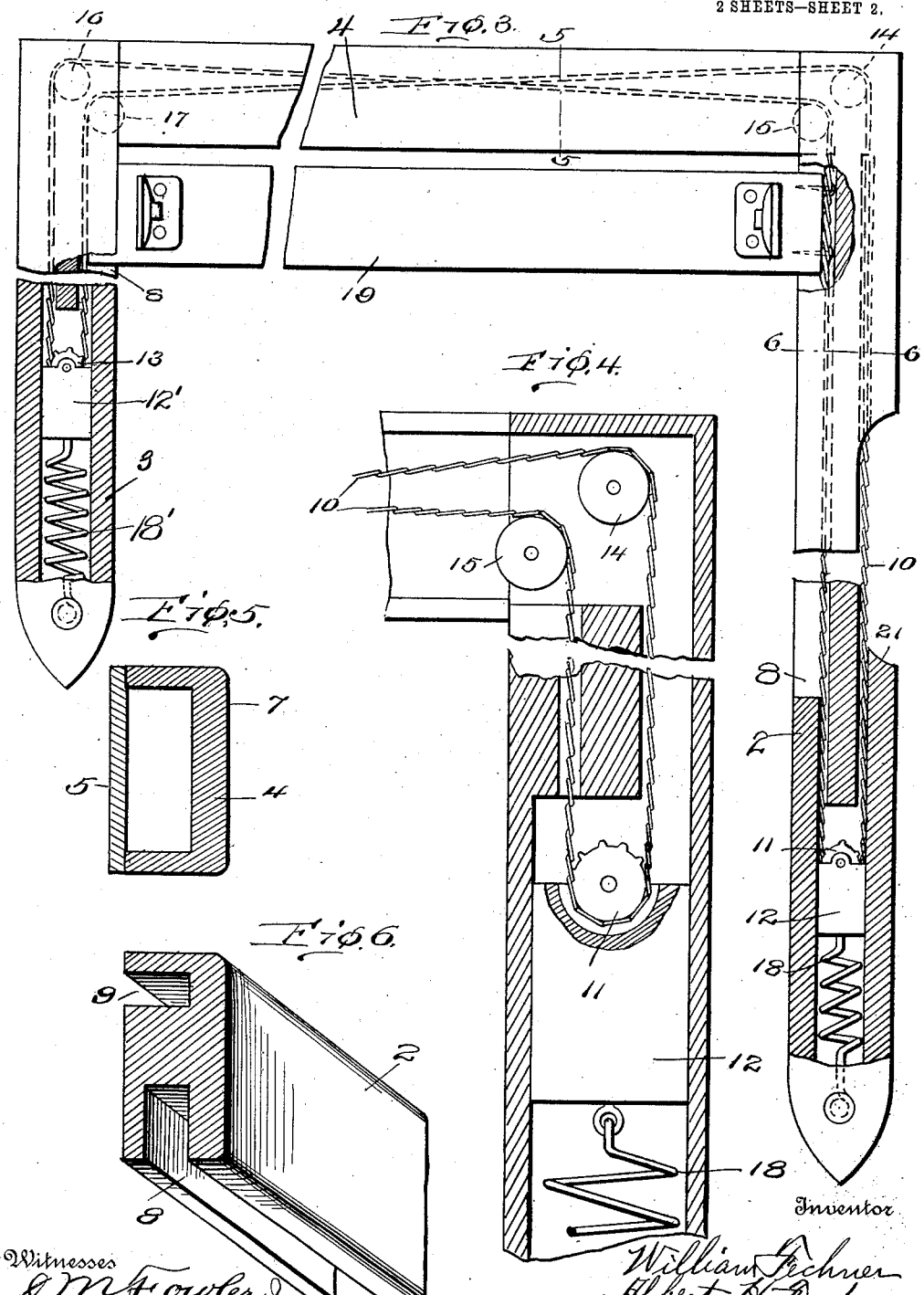

ALBERT HENRY FECHNER AND WILLIAM FECHNER, OF GOLIAD, TEXAS.

WINDOW-SHADE ADJUSTER.

1,016,256.   Specification of Letters Patent.   Patented Feb. 6, 1912.

Application filed November 15, 1909. Serial No. 528,238.

*To all whom it may concern:*

Be it known that we, ALBERT HENRY FECHNER and WILLIAM FECHNER, citizens of the United States, residing at Goliad, in the county of Goliad and State of Texas, have invented certain new and useful Improvements in Window-Shade Adjusters; and we do hereby declare the following to be a full, clear, and exact description of the invention, such as will enable others skilled in the art to which it appertains to make and use the same.

This invention relates to improvements in window shade adjusters, and has for an object the arrangement of means for evenly adjusting the shade to any desired height instantly.

Another object of the invention is the arrangement of a vertically slidable bar for carrying a shade, and means for adjusting the height of said bar and holding the same in said adjusted positions.

A further object of the invention is the arrangement of a framework for carrying chains and anti-friction means for the chains, the framework and chains being arranged for receiving the ends of a cross bar designed to be moved longitudinally of the window and carry a shade thereon so that whenever the chains are moved the cross bar will be adjusted vertically and the shade carried thereby will be correspondingly moved.

With these and other objects in view the invention comprises certain novel constructions, combinations and arrangement of parts as will be hereinafter more fully described and claimed.

In the accompanying drawings: Figure 1 is a front view of the invention applied to a window with the shade carrying bar raised to a position near the top. Fig. 2 is a view similar to Fig. 1, except the shade carrying bar is moved to a position between the top and bottom of the window. Fig. 3 is an enlarged detail fragmentary view of the housing, certain parts being broken away to better disclose the invention. Fig. 4 is an enlarged detail fragmentary sectional view of part of the housing, chain, and means for holding the chain under tension. Fig. 5 is a section through the housing at line 5—5 of Fig. 3. Fig. 6 is a detail fragmentary perspective view of part of one of the upright pieces of the framework.

In constructing a device embodying the invention a framework or housing is provided which is secured to the window frame and is designed to carry an endless chain. Suitable anti-friction pulleys are provided at the turning points of the chain and a reciprocating member is provided at both ends of the chain normally held in place by springs for taking up any slack of the chain, and to make the action of the chain less stiff and unyielding. The uprights or side members of the framework are provided with slots, one of which at each side of the window is designed to receive a cross bar which extends from one side of the window to the other for carrying the shade roller. The ends of the cross bar are secured to the chain so that when the chain is moved the cross bar will be slid or moved up or down according to the movement of the chain, and each end will be moved in unison by reason of the location and arrangement of the chain.

In order that the invention may be more clearly understood, an embodiment of the same is shown in the accompanying drawings, in which 1 indicates a window frame of any desired kind to which is secured a housing formed of upright members 2 and 3, and a cross top member 4. The cross top member 4 is formed substantially U-shaped, as more clearly shown in Fig. 5, with a top or cover 5 which may be removably secured in position. The cross or top member 4 may be secured in position on the window frame 1 by any suitable means, as for instance screws 6 which pass through the top 5 and the main body portion 7. The uprights 2 and 3 are secured to the window frame by any desired means on each side of the window, and extend to nearly the bottom thereof. The uprights 2 and 3 are connected at the top of the window by cross member 4. In arranging the uprights 2 and 3 the same are secured in position so that the grooves 9 of each of the uprights will face the window frame, and thus present a close passage-way, while grooves 8—8 of the uprights 2 and 3 face each other in order to accommodate cross bar 19. The cross bar 19 extends transversely across the window, and has the ends thereof positioned in the grooves 8—8, which ends are secured to the endless chain 10, whereby the cross bar 19 is supported at any desired height according to the way chain 10 is moved.

The chain 10 extends from a roller or pulley 11 pivotally connected with a reciprocating block 12 near the bottom of upright 2, through groove 9 and upright 2, member 4, over pulleys 17, down through groove 8 in upright 3 to near the bottom of upright 3, from thence around pulley 13 pivotally mounted in a sliding block 12′ yieldingly retained in position by spring 18′. From pulley 13 near the bottom of upright 3 the chain extends back through groove 9 of upright 3 over pulley 16, across top member 4, around pulley 15, and from thence down through groove 8 to pulley 11. The chain is crossed as the same passes through the cross top member so that when the chain 10 in grooves 9 of both of the uprights 2 and 3 moves downward the chain in the grooves 8 are moved upward. Mounted in the upper part of upright 2 are rollers 14 and 15 over which the chains pass in their movement, and which act as anti-friction members therefor. Also there are located rollers 16 and 17 in the upper end of upright 3 in a similar manner and for a similar purpose as sprockets 14 and 15. The chain 10 passes a roller 11 mounted near the lower end of upright 2. Rollers 11 and 13 are pivotally mounted in sliding blocks 12 and 12′ which are held in position by springs 18 and 18′, the springs giving the blocks a continuous tendency to move downward toward the bottom of the uprights, and consequently holds continuously taut chain 10. By the use of the springs and sliding members 12 and 12′, and also by the use of a chain passing over rollers, the cross bar 19 connected to the chain located in grooves 8 will be moved longitudinally of the window as the chain is moved. Cross bar 19 is designed to receive a shade 20 of any desired kind and of any desired width. As will be evident the brackets for holding the roller may be set closer together or farther apart as may be desired upon cross bar 19, and then the cross bar raised or lowered as desired for causing shade 20 to extend from the top of the window to the bottom or from a position midway of the window to the bottom as desired. In fact, by this arrangement the shade may be raised and lowered and adjusted in any intermediate position between the top and bottom quickly by grasping chain 10 in cut-away portion 21 of upright portion 2 and moving the chain. The cross bar 19 has the ends thereof positioned in grooves 8 and is guided thereby so that the same is prevented from any twisting or turning movement.

As will be observed from Fig. 1 the operating mechanism is all hidden from view except a small portion of the chain 10 at cutaway portion 21. Also the framework for hiding the operating portion acts as a guide for the cross bar 19, and by its construction presents a pleasing appearance.

What we claim is:

In a vertically adjustable shade hanger, a frame-work adapted to be secured to a window or other casing, said frame-work comprising vertical members having longitudinal grooves therein, the grooves in each member being arranged perpendicular to one another, one groove in each member being formed in the inner side thereof, an endless chain adapted to be passed through the grooves in the vertical members and across at the upper ends from one member to the other, a cross-bar secured to said chain and adapted to move vertically in grooves of said vertical members, a plurality of fixtures carried by said cross-bar to receive a shade roller and tensioning means for said endless chain slidable vertically in said vertical members.

In testimony whereof we affix our signatures in presence of two witnesses.

ALBERT HENRY FECHNER.
WILLIAM FECHNER.

Witnesses:
WALTER BERGMANN,
L. J. LUTENBACHER.

---

Copies of this patent may be obtained for five cents each, by addressing the "Commissioner of Patents, Washington, D. C."